United States Patent [19]

Johnson

[11] 4,109,407

[45] Aug. 29, 1978

[54] ANIMAL TRAP

[76] Inventor: Oscar F. Johnson, Rte. 1, McIntosh, Minn. 56556

[21] Appl. No.: 747,998

[22] Filed: Dec. 6, 1976

Related U.S. Application Data

[63] Continuation-in-part of Ser. No. 621,853, Oct. 14, 1975, abandoned.

[51] Int. Cl.² .................... A01M 23/24; A01M 23/26
[52] U.S. Cl. ............................................. 43/85; 43/91
[58] Field of Search ...................... 43/77–86, 43/88–95

[56] References Cited

U.S. PATENT DOCUMENTS

| | | | |
|---|---|---|---|
| 975,098 | 11/1910 | Wyman | 43/91 |
| 1,146,106 | 7/1915 | Schmidt | 43/91 |
| 1,190,508 | 7/1916 | Brown | 43/81 |
| 1,881,871 | 10/1932 | Nerby | 43/85 |
| 2,231,984 | 2/1941 | Anderson | 43/81 |
| 2,680,323 | 6/1954 | Shaw | 43/91 |

*Primary Examiner*—Ronald E. Suter
*Attorney, Agent, or Firm*—Burd, Braddock & Bartz

[57] ABSTRACT

An animal trap having a pair of arcuate rod-like jaws that are biased to a closed position with a torsion coil spring. One jaw is integral with a first rod attached to a base. The other jaw is attached to a second rod pivotally mounted on the first rod with a sleeve. The coil torsion spring is concentrically located about the sleeve and rod and has a first end engageable with the base and a second end engageable with the second jaw so as to bias the jaws to their closed position. A trigger mechanism having a trip plate cooperating with a pivotal arm is used to releasably hold the jaws in their open position. A member connected to the jaws engages the arm so that the biasing force of the spring will hold the trip plate in its set position. When the trip plate is moved from its set position, the arm is released so that the spring will close the jaws. In one form of the invention, the trap has two pairs of jaws that are concurrently biased to their closed positions with pairs of coil torsion springs. A common trigger mechanism holds both pairs of jaws in their open positions.

31 Claims, 22 Drawing Figures

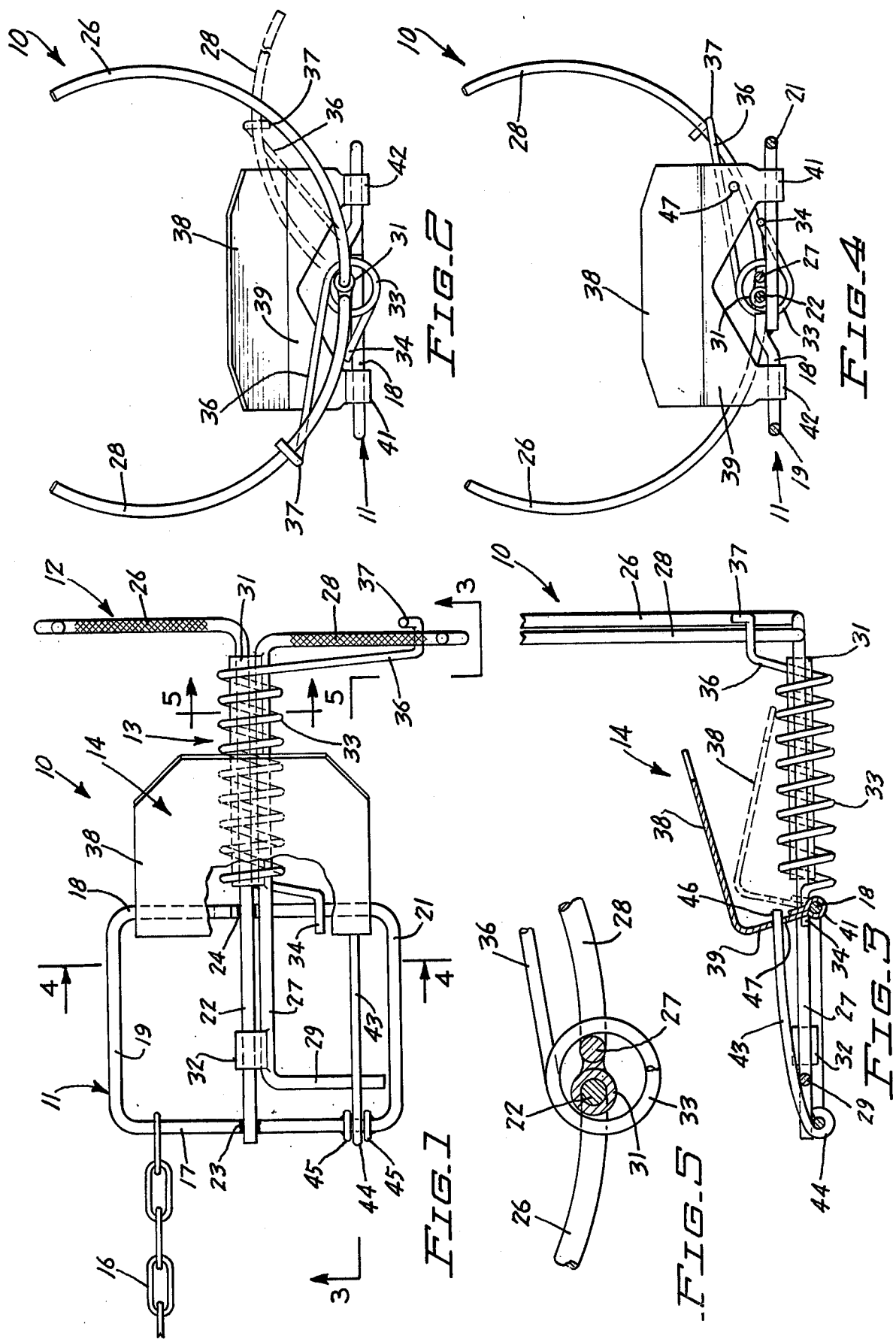

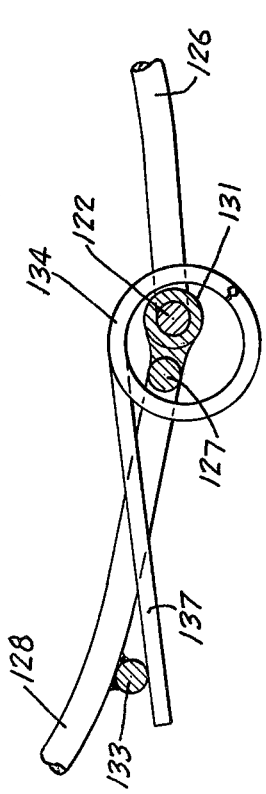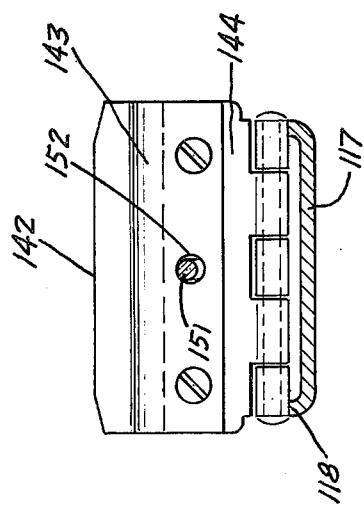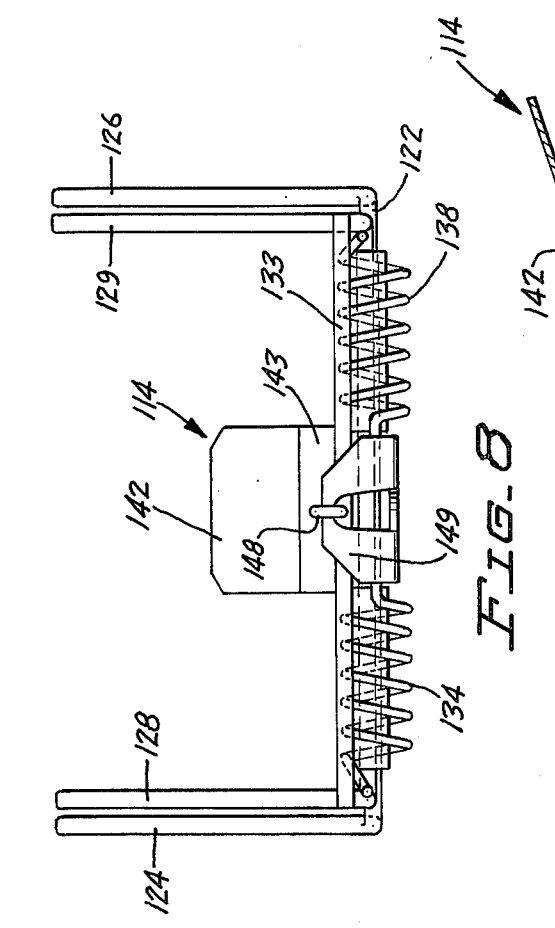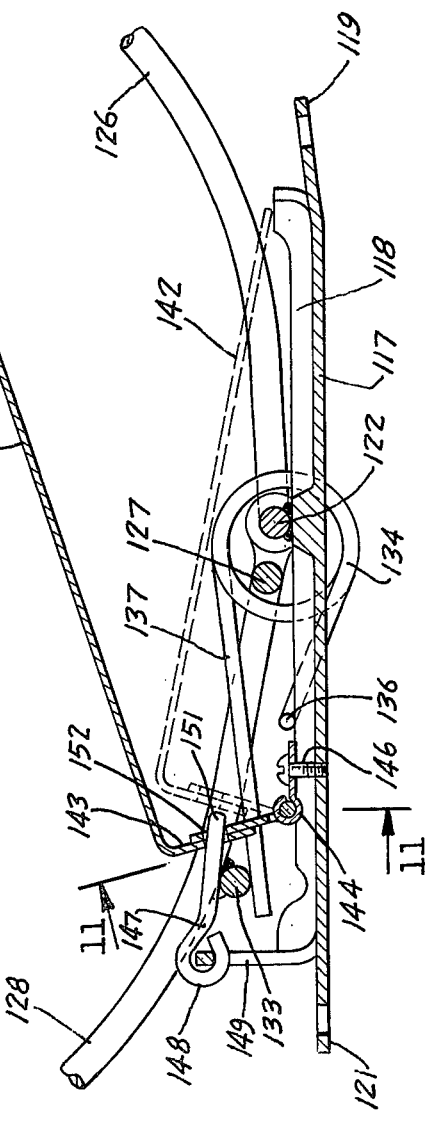

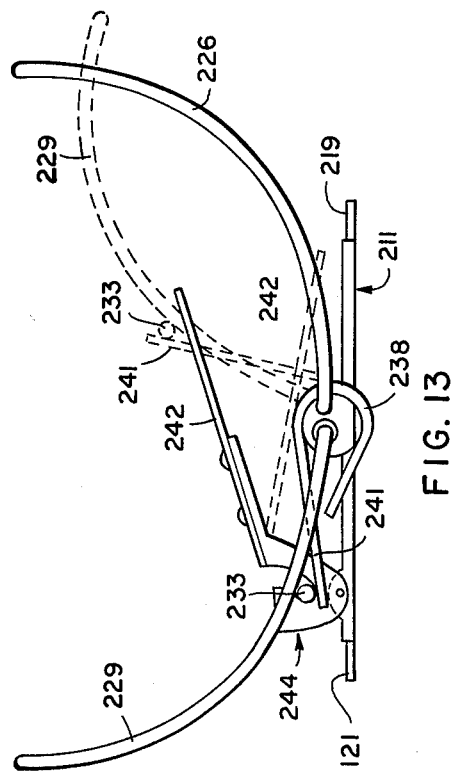
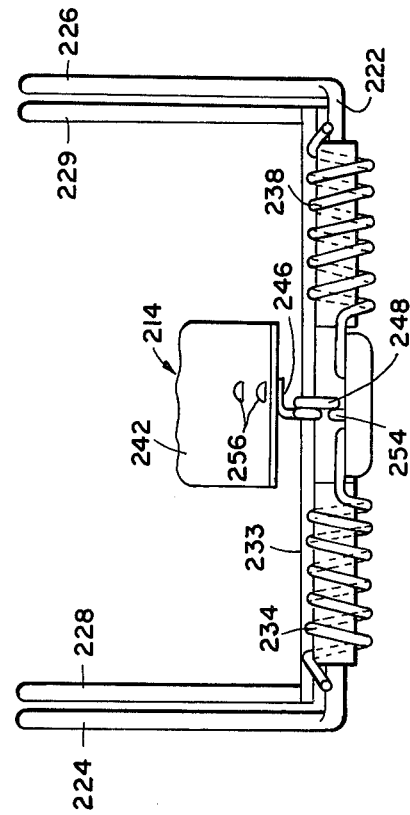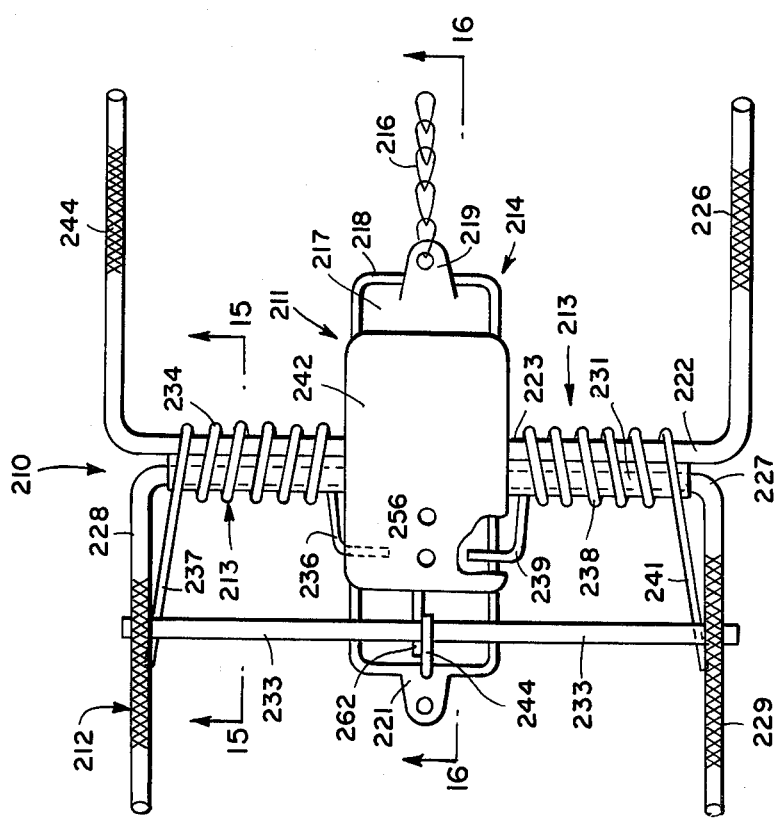

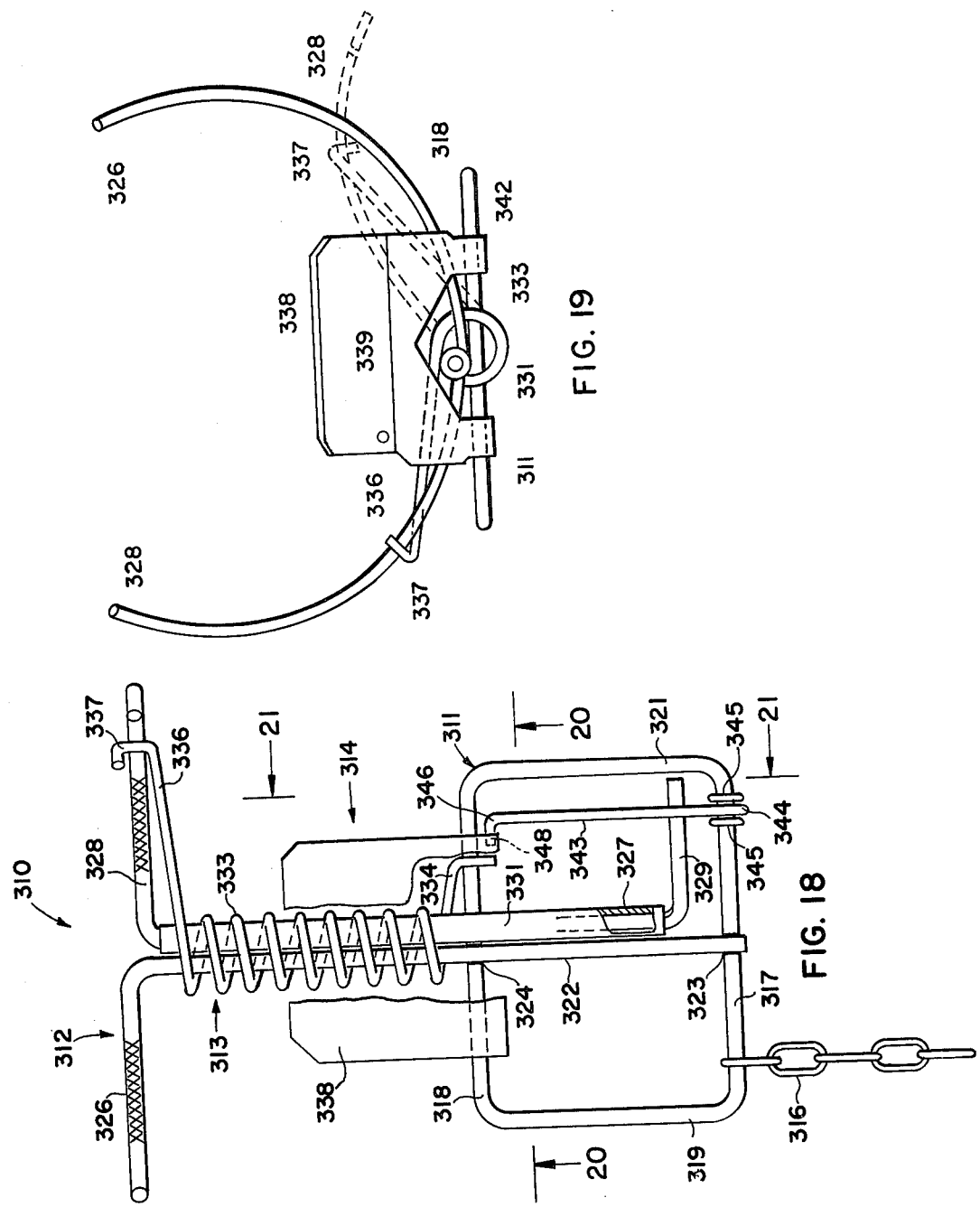

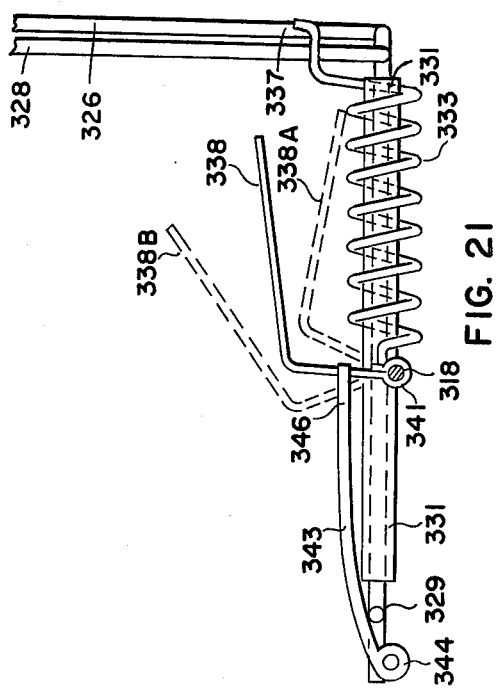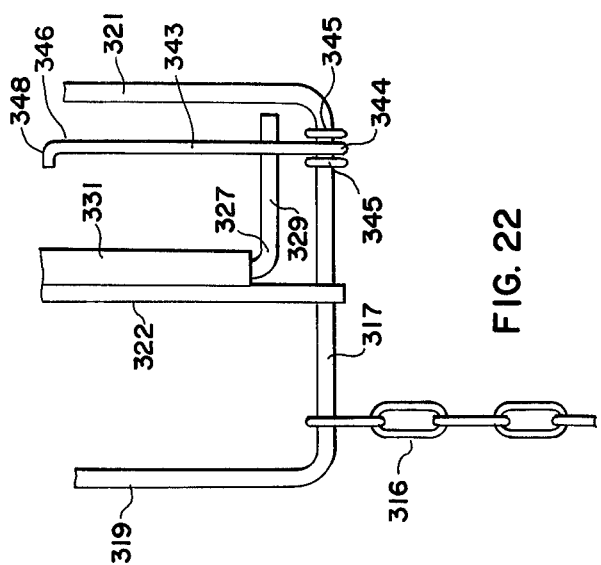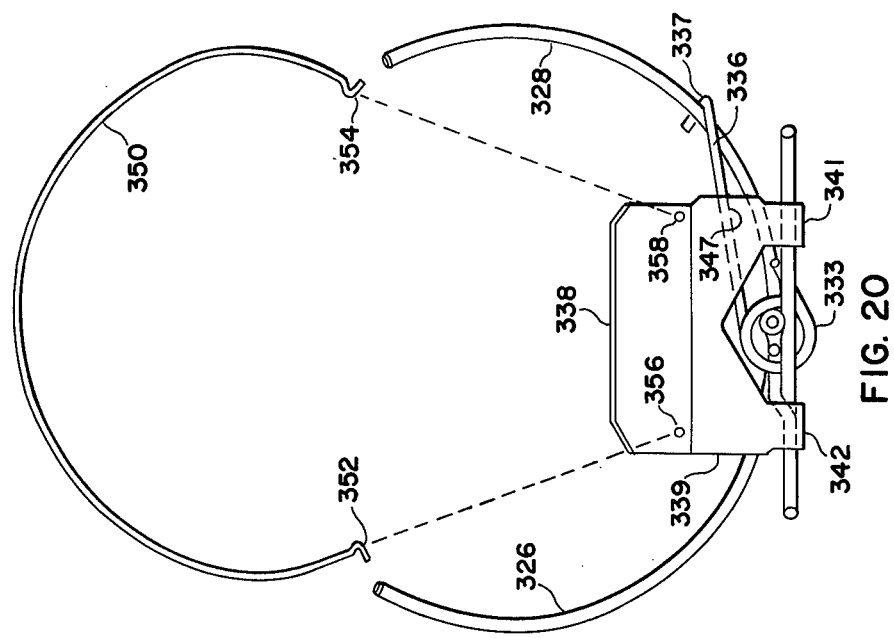

ANIMAL TRAP

CROSS-REFERENCE TO RELATED APPLICATION:

This application is a continuation-in-part application of prior application Ser. No. 621,853 of Oscar F. Johnson for an Animal Trap, filed Oct. 14, 1975 and now abandoned.

BACKGROUND OF INVENTION

Spring operated animal traps having movable jaws are used to trap a variety of wild animals. Examples of spring biased traps are disclosed by Harrington in U.S. Pat. No. 1,029,992 and Beaulieu in U.S. Pat. No. 3,057,111. These traps have centrally located trigger mechanisms and springs which close pair of jaws when the trigger mechanism is released. These types of traps are operable to catch and hold the foot of an animal. In the event the animal escapes from the trap, there is considerable damage to the foot of the animal. These types of traps do not kill the animal so that the animal is subjected to considerable pain until the trapper services the trap.

Cratty in U.S. Pat. No. 1,442,385 discloses a trap operable to engage and hold an animal by contact with its body to insure against the animal releasing himself by gnawing off its foot or leg. This trap has two pairs of pivoted jaws that are actuated by separate coil springs. A centrally located treadle and holding mechanism is used to releasably hold the trap in its set position. A similar trap is shown by Layton in U.S. Pat. No. 1,296,407.

SUMMARY OF INVENTION

The invention is related to an animal trap having jaw members that are biased to a closed position with a spring. A trigger mechanism is operable to hold the jaws in their open or set position. The trap has a first member attached to a base. A first jaw is secured to the first member. A second member is rotatably mounted on the first member. A second jaw is secured to the second member. The second jaw is located adjacent the first jaw and movable relative thereto. The jaws are arcuate rod members. The biasing means is a coil torsion spring concentrically positioned about portions of the first and second members and operable to bias the jaws to their closed position. The trigger mechanism includes a trip plate and a holding arm. The holding arm engages a member that is connected to a jaw to hold the jaws in the open position. The trip plate is held by the arm which is engaged by the member when the trap is set. The animal moves the trip plate to its release position whereby the holding effect of the arm is released and the spring will close the jaws. The trip plate is located inwardly of the jaws so that when the animal moves the trip plate, the jaws will engage the chest area of the animal. The compression and holding forces of the jaws will quickly and humanely kill the animal.

An object of the invention is to provide an animal trap that has jaws operable to engage the chest and heart area of the animal to quickly and humanely kill the animal by applying a strong pressure to the body of the animal. Another object of the invention is to provide a trap having movable jaws that are usable in a muskrat hut. A further object of the invention is to provide a trap usable for trapping beavers which may move in either direction along a beaver run. Yet another object of the invention is to provide an animal trap with two pairs of spring biased jaws a trigger mechanism located between the jaws so that the trap will effectively trap animals that enter the trap from either end. Still another object of the invention is to provide an animal trap that is simple and sturdy in construction, reliable in use, and which effectively and quickly kills the animal. These and other objects of the invention are set forth in the following detailed description of the several embodiments of the animal trap.

IN THE DRAWINGS:

FIG. 1 is a top plan view of an animal trap of the invention, with parts broken away to facilitate illustration of the anchoring end of the spring;

FIG. 2 is an elevational view of the right end of the trap of FIG. 1;

FIG. 3 is a sectional view taken along line 3—3 of FIG 1;

FIG. 4 is a sectional view taken along line 4—4 of FIG. 1;

FIG. 5 is an enlarged sectional view taken along line 5—5 of FIG. 1;

FIG. 8 is a side elevational view of the left side of FIG. 1;

FIG. 9 is an enlarged sectional view taken along line 9—9 of FIG. 6;

FIG. 10 is an enlarged sectional view taken along line 10—10 of FIG. 6;

FIG. 11 is an enlarged sectional view taken along line 11—11 of FIG. 9;

FIG. 12 is a top plan view of a second modification of the animal trap of the invention, with parts broken away to facilitate illustration;

FIG. 13 is an end elevational view of the trap of FIG. 12;

FIG. 14 is a side elevation of the trap of FIG. 12;

FIG. 18 is a top plan view of a third modification of the animal trap, with parts broken away to facilitate illustration of the anchoring end of the spring;

FIG. 19 is an end elevation of the trap of FIG. 18;

FIG. 20 is a sectional view taken along the line 20—20 of FIG. 18, with a flexible band mountable on a trip plate of the trap;

FIG. 21 is a sectional view taken along the line 21—21 in FIG. 18; and

FIG. 22 is a top plan view of the trap with parts removed for purposes of illustrating a holding arm of the trap.

DESCRIPTION OF PREFERRED EMBODIMENTS

Figures 6, 7:
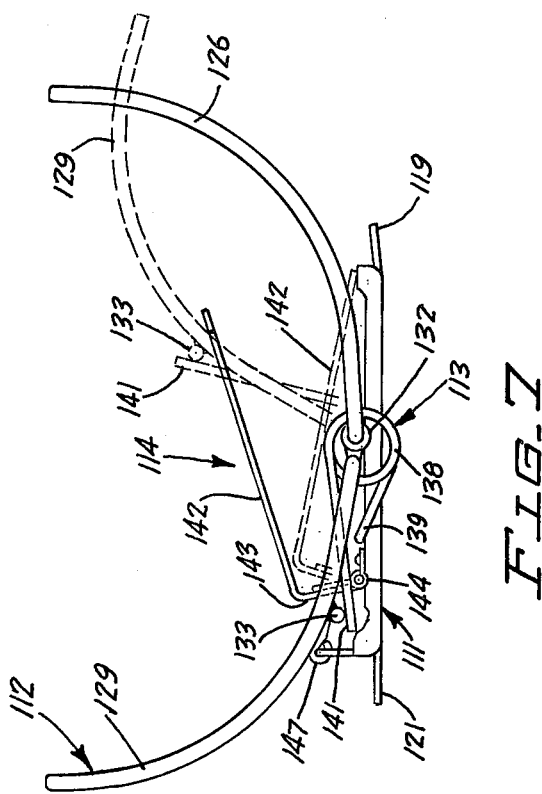
FIG. 6 is a top plan view of a first modification of the animal trap of the invention, with parts broken away to facilitate illustration of one spring.
FIG. 7 is an end elevational view of the right end of FIG. 6.
Figure 15:
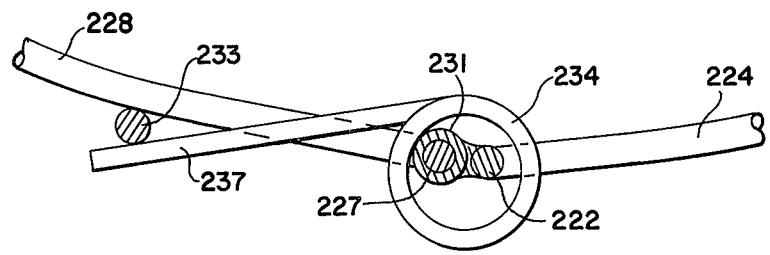
FIG. 15 is an enlarged sectional view taken along the line 15—15 in FIG. 12.

Referring to the drawing, there is shown in FIGS. 1-5 an animal trap, such as used in trapping muskrats and similar small animals. Trap 10 has a base 11 carrying a movable animal holding structure 12. A biasing means 13 functions to close the holding structure 12 when an animal engages and trips a trigger mechanism 14. Trigger 14 cooperates with the holding structure 12 to hold it in the open position against the force of the biasing means 13. An anchor chain 16 connected to base 11 is used to secure the trap 10 to a fixed support or object (not shown).

Base 11 is a rectangular shaped rod having parallel side portions 17 and 18 and parallel end portions 19 and 21. Side portions 17 and 18 are longer than end portions 19 and 21.

Animal holding structure 12 comprises a first rod 22 secured to the midsection of side portions 17 and 18 with welds, solder or the like, shown at 23 and 24. Rod 22 extends laterally from base 11 and is attached to an arcuate jaw 26. Jaw 26 is a segment of a circle having an arc of about 80 degrees. Located adjacent one side of first rod 22 is a second elongated rod 27. Second rod 27 is attached to an arcuate jaw 28. Jaw 28 is a segment of a circle and has an arcuate length of approximately 80 degrees and faces jaw 26. The inside surfaces of jaws 26 and 27 have grooves, indentations or knurls to provide a gripping force on the animal trapped between the jaws. The end of rod 27 opposite jaw 28 has an outwardly and laterally directed finger or member 29 which forms part of the holding mechanism to releasably retain the jaws 26 and 28 in their open positions, as shown in full lines in FIGS. 2 and 4, against the biasing force of the biasing means 13.

The second rod 27 is rotatably mounted on the first rod 22 with a pair of tubular members or sleeves 31 and 32. Sleeve 31 extends outwardly from adjacent the side portion 18 to the jaw 26. Sleeve 32 is located adjacent finger 29. Attaching means, as welds, solder or the like, are used to secure the sleeves 31 and 32 to rod 27. The sleeves 31 and 32 are located about rod 22 so that they are free to rotate on rod 22.

Biasing means 13 comprises an elongated coil torsion spring 33 concentrically located about the sleeve 31 and rod 27. Spring 33 is a torsion spring having a first end 34 bearing against the top of the base side portion 18. The opposite end of spring 33 has an elongated end 36 terminating in a lateral projection or finger 37. Finger 37 is located about an intermediate portion of the outside of jaw 28. When the jaws 26 and 28 are in the closed positions, as shown in broken lines in FIG. 2, finger 37 engages the jaw 26 and thereby functions as a stop so that the jaws 26 and 27 will not be moved past each other by torsion spring 33.

The trigger mechanism 14 has a generally flat trip plate 38 attached to a downwardly directed back 39. The lower outside portions of back 39 terminate in feet or tubular pivot projections 41 and 42. As shown in FIG. 3, projection 41 is turned about the side portion 18. Projection 42 is also turned about side portion 18, thereby pivoting the plate 38 on the side portion. Projections 41 and 42 are located adjacent opposite sides or rods 22 and 27.

The back 39 cooperates with a holding arm 43 to releasably hold the jaws 26 and 28 in the open positions. The arm 43 has a turned end or eye 44 located about the side portion 17. Washers or rings 45 located adjacent opposite sides of end 44 are secured to the side portion 17 to prevent lateral movement of the arm 43 relative to side portion 17. Arm 43 has a free end 46. As shown in FIG. 3, end 46 projects through a hole 47 in back 39 so that the back 39 will limit the pivotal movement of arm 43. The finger 29 is located below arm 43 and is urged upwardly by the action of torsion spring 33. This biases the arm 43 into engagement with the back 39, thereby holding the plate 38 in its cocked angular position, as shown in full lines in FIG. 3.

Trap 10 is used to trap muskrats and mink. Trap 10 is placed inside the animal hut adjacent the opening to the hut. The huts are normally located in small bodies of water with the animal entering the hut from below the water. The chain 16 is anchored to a portion of the hut. The jaws 26 and 28 face the exit opening into the hut.

The trap 10 is set by moving the jaws 26 and 28 to the open position against the biasing force of the torsion spring 33. As the jaws 26 and 28 are opened, the spring 33 is turned or coiled so that it exerts a closing force on the jaws 26 and 28. When finger 29 is located below the arm 43, the end 46 of arm 43 is placed in hole 47. This is done by pivoting the plate 38 in an upward direction to its set position. The force of the spring 33, acting through finger 29 on arm 43, holds plate 38 in its inclined or set position, as shown in FIG 3.

When the animal moves into the hut, the front feet or head of the animal will engage the plate 38. The plate 38 will be moved to a down position, as shown in broken lines in FIG. 3. This releases arm 43 from the back 39. The spring 33 will then pivot the jaws 26 and 28 to their closed positions about the chest portion or front section of the body of the animal. The animal will be trapped between the closed jaws 26 and 28 in a manner so that the continuous pressure on the chest and heart of the animal will quickly and humanely kill the animal.

Referring to FIGS. 6-11, there is shown a first modification of the trap of the invention indicated generally at 110. Trap 110 is double entrance trap used for small wild animals, as beaver and nutria.

Trap 110 has a flat base 111 carrying an animal catching and holding structure 112. Biasing means 113 coact with the holding structure to close structure 112. A trigger mechanism 114 functions to maintain the holding structure 112 in an open position against the force of the biasing means 113. When the trigger mechanism 114 is actuated by the animal, the holding structure 112 will close to capture the animal. An anchor chain 116 connected to base 111 is provided to secure the trap 110 to a fixed object or support (not shown).

Base 111 comprises a generally flat plate 117 having an upright peripheral flange 118. Opposite ends of the plate 117 have outwardly directed ears 119 and 121 for accommodating the anchor chain 116.

The holding structure 112 has a first transverse rod 122 secured by welds 123 to center portions of the flange 118. Rod 122 extends laterally from opposite sides of the plate 117. A first upright arcuate jaw 124 is integral with one end of rod 122. In a similar manner, a second upright arcuate jaw 126 is integral with the opposite end of the rod 122. Jaws 124 and 126 each have a circular configuration and inside surfaces that are grooved or knurled to enhance the holding force on the animal held by the jaws. The holding structure 112 has a second rod 127 positioned adjacent and parallel to the first rod 122. The second rod 127 has an end carrying a first arcuate jaw 128. The opposite end of rod 127 has a second arcuate jaw 129. The jaws 128 and 129 each have an arcuate or circular configuration and face the jaws 124 and 126. The jaws 124, 126, 128 and 129 are segments of a circle having arcuate extents of approximately 80 degrees. Other curvatures and arcuate lengths can be used for the jaws. The inside surfaces of all the jaws have grooves, knurls or short teeth which minimize slipping of the animal which is trapped between the pairs of jaws 124, 128 and 126, 129.

A pair of elongated sleeves or tubular members 131 and 132 are rotatably mounted on the opposite portions of the first rod 122. The sleeves are secured by welds or the like to the adjacent portions of the second rod 127 so that jaws 128 and 129 effectively rotate about the axis of the rod 122.

A transverse bar or member 133 extends between intermediate portions of jaws 128 and 129. Opposite ends of bar 133 are secured by welds or the like to jaws 128 and 129.

The biasing means 113 comprises a pair of coil torsion springs 134 and 138. The first spring 134 has an inside end 136 that rests on top of a portion of the flange 118 of plate 117. Spring 134 has a second or outer end 137 that extends outwardly and engages the outside of the end of bar 133. Spring 138 is similar to spring 134 and has an inside end 139 that engages the top of flange 118. Spring 138 has a second outside end 141 that extends outwardly and engages the outside end portion of bar 133. The springs 134 and 138 act in concert to bias the jaws 128 and 129 toward the jaws 124 and 126. When the holding force on the bar 133 is released, springs 134 and 138 will move the jaws 128 and 129 to their closed positions, as shown in broken lines in FIG. 7.

The trigger mechanism 114 comprises a trip plate 142 having a generally downward directed back 143. A hinge 144, shown in detail in FIG. 11, pivotally mounts the back 143 on the base flange 118. The axis of hinge 144 is parallel to the rods 122 and 127. As shown in FIG. 9, fastening devices 146, as bolts, attach the hinge 144 to the base plate 117.

A pivoted holding arm 147 engages the bar 133 to releasably hold the jaws 124, 128 and 126, 129 in their open positions. Holding arm 147 has an eye portion 148. As shown in FIG. 9, portion 148 is located about an upwardly directed tab 149 integral with one end of base 117. Arm 147 has a free end 151 projected through a hole 152 in back 143 and part of hinge 144. When plate 142 is in its raised or set position, the end 151 is located in hole 152. Bar 133 engages the bottom side of arm 147, thereby preventing the jaws 124, 128 and 126, 129 from moving to their closed positions.

In use, the trap 110 is placed along a beaver run and is usable to trap beaver or similar animals that move in either direction along the run. The trap 110 is set by forcing jaws 124, 128 and 126, 129 to the open positions against the biasing forces of the springs 134 and 138. Jaws 128 and 129 are pivoted away from jaws 124 and 126 until the bar 133 is adjacent the base plate 117. At this time the holding arm 147 can be pivoted to a generally horizontal position. The free end 151 of arm 147 is inserted through hole 152. This is done by raising the plate 142. The spreading forces applied to the jaws 124, 126 and 128, 129 is then released. The springs 134 and 138 will apply a biasing force to the arms which will force the bar 133 in an upward direction into engagement with the bottom side of arm 147. This force is sufficient to hold end 151 in hole 152. The opposite edges of back 143 bite into the end 151 and hold the plate 143 in its up position.

The trap is tripped by the animal coming in contact with the plate 142. The plate 142, being located in the middle of the trap, insures that the animal will be caught by either pair of arms 124, 128 or 126, 129. The pairs of arms engage the chest or heart area of the animal and apply sufficient force to provide for relatively quick and humane killing of the animal. On engaging the plate 142, the animal will move the plate to the lowered position shown in broken lines in FIG. 7. This releases the holding arm 147 so that the bar 133 is free to move in an upward direction.

Referring to FIGS. 12 through 17, there is shown a second modification of the trap of the invention indicated generally at 210. Trap 210, similar to trap 110, is a double entrance trap used for small wild animals, as beaver and nutria.

Trap 210 has a flat base 211 carrying an animal catching and holding structure 212. Biasing means 213 coact with holding structure 212 to bias it to a closed position. A trigger mechanism 214 functions to maintain holding structure 212 in an open position against the force of biasing means 213. When trigger mechanism 214 is actuated by the animal, holding structure 212 closes to capture the animal. An anchor chain 216 connected to base 211 is provided to secure trap 210 to a fixed object or support (not shown).

Base 211 comprises a generally flat plate 217 having an upright peripheral flange 218. Opposite ends of plate 217 have outwardly directed ears 219 and 221, each adapted to accommodate anchor chain 216.

Holding structure 212 has a first rod 222 secured by welds at 223 to center portions of flange 218. Rod 222 extends laterally from opposite sides of plate 217. A first upright arcuate jaw 224 is integral with one end of rod 222. A second upright arcuate jaw 226 is integral with the opposite end of rod 222. Jaws 224 and 226 each have a circular configuration and inside surfaces that are grooved and knurled to enhance the holding force on the animal held by the jaws. Holding structure 212 has a second rod 227 positioned adjacent and parallel to first rod 222. Second rod 227 has one end carrying a first arcuate jaw 228. At the opposite end of rod 227 is a second arcuate jaw 229. Jaws 228 and 229 each have a circular configuration and face jaws 224 and 226, respectively. Jaws 224, 226, 228 and 229 are segments of a circle having arcuate extents of approximately 80 degrees. Other curvatures and arcuate lengths can be used for the jaws.

A sleeve or tubular member 231 is rotatably mounted on second rod 227. The sleeves are secured by welds or the like to the adjacent portions of first rod 222 so that jaws 224 and 226 substantially rotate about the axis of second rod 227. A transverse bar or member 233 extends between intermediate portions of jaws 228 and 229. Opposite ends of bar 233 are secured by welds or the like to jaws 228 and 229.

Biasing means 213 comprise a first coil torsion spring 234 and a second coil torsion spring 238. First spring 234 has an inside end 236 which rests on top of a portion of flange 218 of plate 217. Spring 234 has a second or outer end 237 that extends outwardly and engages an outside end portion of bar 233 proximate first jaw 228. Spring 238 is similar to spring 234, having an inside end 239 that engages the top of flange 218. Spring 238 has a second outside end 241 extending outwardly and engaging an outside end portion of bar 233 opposite to that engaged by end 237. Springs 234 and 238 cooperate to bias jaws 228 and 229 toward jaws 224 and 226. With the holding force on bar 233 released, springs 234 and 238 move jaws 228 and 229 to the closed position, as is shown by the broken lines in FIG. 13.

Figure 16:
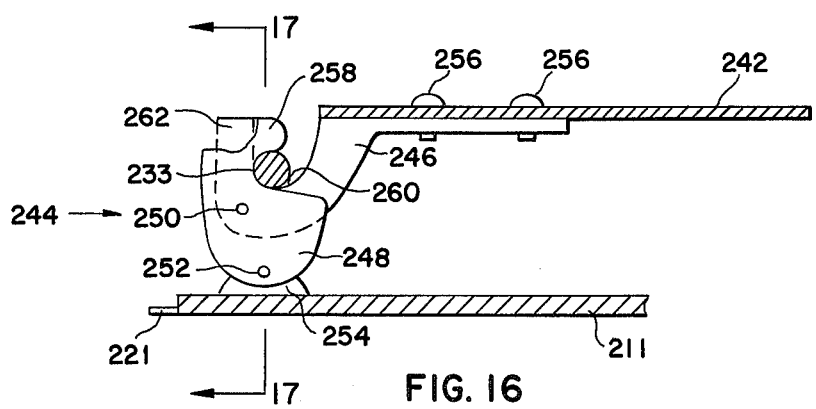
FIG. 16 is an enlarged sectional view taken along the line 16—16 in FIG. 12, with parts removed to facilitate illustration.
Figure 17:
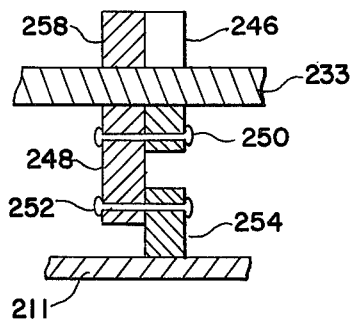
FIG. 17 is a further enlarged sectional view taken along the line 17—17 in FIG. 16.

Trigger mechanism 214 comprises a trip plate 242 and a pivotal holding arm 244. As shown in FIGS. 16 and 17, holding arm 244 includes an outwardly extending finger 246 and a detent 248. Finger 246 and detent 248 are mounted pivotally with respect to one another by a first pin 250. A second pin 252 mounts detent 248 to an upstanding lug 254 fixed to base 211. Screws at 256 mount trip plate 242 to a portion of finger 246. The axes of pins 250 and 252 are parallel to rods 222 and 227.

Detent 248 includes a hooked portion 258 which engages bar 233 to releasably hold jaws 224, 226, 228 and 229 in the open position. Biasing means 213 biases bar 233 upwardly against a flat and horizontal bottom surface of hook portion 258. Hooked portion 258 is adapted to prevent further upward movement of bar 233 so long as finger 246 and trip plate 242 remain undisturbed.

Trap 210 when placed along a beaver run is adapted to trap beaver or similar animals moving in either direction along the run. Trap 210 is set by forcing jaw pairs 224-228 and 226-229 apart to the open position against the biasing force of springs 234 and 238. Jaws 228 and 229 are pivoted away from jaws 224 and 226 until bar 233 is adjacent base plate 217, where upon bar 233 is insertable into a concave portion 260 of finger 246 and beneath hooked portion 258 of detent 248. Following insertion, the jaws pairs are allowed to move slowly toward the closed position. This causes upward movement in bar 233 until it firmly engages hooked portion 258. Extraneous pressure is then released so that hooked portion 258 provides the sole holding force counter to biasing means 213. Trip plate 242 is free to rotate downward until an upstanding projection 262 of finger 246 engages bar 233. Trip plate 242 is then held in an upward or cocked position as shown in FIG. 16.

Trap 210 is tripped by the animal coming in contact with plate 242 and moving plate 242 out of the cocked position by stepping on plate 242 or through other application of slight force. Downwardly directed force applied to the free end of plate 242, for example, causes clockwise rotation of plate 242 and finger 246 with respect to detent 248 about first pin 250. Projection 262 of finger 246, engaged with bar 233, rotates to force bar 233 out from beneath hooked portion 258. This releases bar 233 to move in the upward direction and snap the jaws into the closed position responsive to biasing means 213.

The use of trigger mechanism 214 facilitates the setting of trap 210. When jaw pairs 224–228 and 226–229 are forced apart from one another a sufficient amount, bar 233 is directed into engagement with concave portion 260 of finger 246. With the jaw pairs forced open, trip plate 242 is pulled upward. This causes clockwise rotation in detent 248 about second pin 252. Sufficient upward pulling of trip plate 242 rotates detent 248 until hooked portion 258 is directly above bar 233. Bar 233 is then eased upward until it engages hooked portion 258. The force of bar 233 against hooked portion 258 holds detent 248 in an upright position whereby bar 233 and hooked portion 258 are substantially vertically above second pin 252. The weight of trip plate 242 and finger 246 causes pivoting in finger 246 clockwise about first pin 250 until projection 262 engages bar 233. The force of bar 233 against hooked portion 258 prevents further clockwise rotation of finger 246 under its own weight, yet slight application of downward force to the free end of trip plate 242 readily causes projection 262 to push bar 233 free of hook portion 258.

Referring to FIGS. 18–22, there is shown a third modification of the animal trap indicated generally at 310, adapted for trapping muskrats and similar small animals. Trap 310 has a base 311 carrying a movable animal holding structure 312. A biasing means 313 functions to close holding structure 312 when an animal engages and trips a trigger mechanism 314. Trigger mechanism 314 cooperates with holding structure 312 to hold it in the open position against the force of biasing means 313. An anchor chain 316 connected to base 311 is used to secure trap 310 to a fixed support or object, not shown. Base 311 is a rectangular shaped rod having parallel side portions 317 and 318, and parallel end portions 319 and 321. Side portions 317 and 318 are longer than end portions 319 and 321.

Animal holding structure 312 comprises a first rod 322 secured to the midsection of side portions 317 and 318 with welds, solder or the like, as shown at 323 and 324. Rod 322 extends laterally from base 311 and is attached to an arcuate jaw 326. Jaw 326 is a segment of a circle having an arc of about 80°. Located adjacent one side of first rod 322 is an elongate second rod 327. Second rod 327 is attached to an arcuate jaw 328. Jaw 328 is a segment of a circle and has an arcuate length of approximately 80° and faces jaw 326. The inside surfaces of jaws 326 and 326 have grooves, indentations or knurls to provide a gripping force on an animal trapped between the jaws. The end of rod 326 opposite jaw 328 has an outwardly and laterally directed finger or member 329 which forms part of the holding mechanism to releasably retain the jaws 326 and 328 in their open positions against the biasing force of biasing means 313, as is shown by the solid lines in FIGS. 19 and 20.

Second rod 327 is rotatably mounted with respect to first rod 322 with a tubular member or sleeve 331. Sleeve 331 surrounds second rod 327 and extends along substantially the entire length thereof. Rod 327 is free to rotate within sleeve 331. Sleeve 331 is fixed to first rod 326 with welds, solder or the like.

Biasing means 313 comprises an elongated coil torsion spring 333 concentrically located about sleeve 331 and rods 322 and 327. Spring 333 is a torsion spring having a first end 334 bearing against the top of side portion 318. At the opposite end of spring 333 is an elongate end 336 terminating in a lateral projection or finger 337. Finger 337 is located about an intermediate portion of the outside of jaw 328. When jaws 326 and 328 are in the closed position, as shown by the broken lines in FIG. 19, finger 337 engages jaw 326 and thereby serves as a stop to prevent jaws 326 and 328 from moving past one another responsive to spring 333.

Trigger mechanism 314 includes a generally flat trip plate 338 attached to a downwardly directed back 339. The lower outside portions of back 339 terminate in feet or tubular pivot projections 341 and 342. As shown in FIG. 21, projection 341 is turned about side portion 318. Likewise, projection 342 is turned about side portion 318, thereby pivoting plate 338 on the side portion. Projections 341 and 342 are located adjacent opposite sides of rods 322 and 327.

Back 339 cooperates with a holding arm 343 to releasably hold jaws 326 and 328 in the open position. Arm 343 has a turned end or eye 344 located about side portion 317. Washers or ringers 345 located adjacent opposite sides of eye 344 are secured to side portion 317 and prevent lateral movement of arm 343 with respect to side portion 317. Arm 343 has a free end 346 including an inwardly and laterally directed extension 348, most clearly seen in FIG. 22. As shown in FIG. 21, extension 348 projects into a slot 347 in back 339 so that back 339 can restrict the pivotal movement of arm 343. Finger 329 is located below arm 343 and is urged upwardly by torsion spring 333. This biases arm 343 into engagement with back 339, thereby holding plate 338 in the cocked angular position shown in solid lines in FIG. 21.

Trap 310 is well suited to trap muskrats and mink when it is placed inside an animal hut adjacent the opening to the hut. The huts are normally located in small bodies of water with the animal entering the hut from below the water level. Chain 316 is anchored to a portion of the hut. Jaws 326 and 328 are placed outside the hut and facing the opening.

Trap 310 is set by moving jaws 326 and 328 to the open position against the biasing force of torsion spring 333. As jaws 326 and 328 are opened, spring 333 is turned or wound so that it exerts a closing force on jaws 326 and 328. With finger 329 located below arm 343, extension 348 of arm 343 is positioned in slot 347. This is accomplished by pivoting plate 338 upwardly to its set position. The force of spring 333, acting through finger 329 on arm 343, maintains plate 338 in the cocked or set position.

When the animal moves into the hut, the front feet or head of the animal engage plate 338, and plate 338 is moved into a down position as shown at 338A in FIG. 21. This releases arm 343 from back 339. Spring 333 then pivotally snaps jaws 326 and 328 to the closed position about the chest portion or front section of the body of the animal. The animal is trapped between closed jaws 326 and 328 in a manner so that the continuous pressure on the chest and heart of the animal quickly and humanely kills the animal.

Alternatively, the animal may engage plate 338 with its head to move plate 338 upwardly as shown at 338B in FIG. 21. Back 339 and therefore slot 347 are moved away from extension 348 in the direction of side portion 317 rather than toward jaws 326 and 328. In other respects, however, the springing action of trap 310 is similar to the action responsive to a downward movement of plate 338. With extension 348 free of slot 347, holding arm 343 no longer maintains finger 329 downwardly against the force of coiled spring 333. Jaws 326 and 328 resultantly snap to the closed position responsive to coil springs 333.

Trap 310 further includes means for trapping an animal stepping or leaping over trap 310 in the vicinity of plate 338. A flexible wire band 350 is arcuate in shape and mountable to plate 338 and is adapted to extend above plate 338. Band 350 is bent at each end to form a first prong 352 and a second prong 354, each of prongs 352 and 354 extending radially outward from the center of the arc defined by the band 350. Pronts 352 and 254 are insertable into a pair of openings in plate 338 at 356 and 358.

Band 350 is shown in FIG. 20 removed from plate 338 and in an unstressed condition. In the unstressed condition, the linear distance between prongs 352 and 354 is greater than the corresponding distance between openings 356 and 358. Band 350 must therefore be contracted so as to define a smaller circle prior to insertion of prong 352 and 354 into openings 356 and 358. Such contraction creates bending stress in band 350 which tends to bias prongs 352 and 354 away from each other. This force is slight, however, and is easily overcome by moderate hand pressure. Contracted band 350 is attached to plate 338 by inserting prongs 352 and 354 into openings 356 and 358. Bending stress in band 350 biases prongs 352 and 354 outwardly against the outside edges of openings 356 and 358. This bending or biasing force is sufficient to maintain band 350 mounted in an upright position above plate 338.

An animal crossing the trap in either direction may leap or bound over the trap, missing entirely plate 338. The animal nonetheless contacts band 350. Pressure applied to band 350 in either direction causes movement in plate 338 and therefore frees extension 348 from slot 347 in the same manner as if the animal had directly contacted plate 338.

While there have been shown and described preferred embodiments of the invention, it is understood that changes in the size, structure and structural arrangements of parts may be made by those skilled in the art without departing from the invention. For example, any plates 38, 142, 242 and 338 can be provided with holes to accommodate means to attach bait to the plates.

The embodiments of the invention in which an exclusive property or privilege is claimed are defined as follows:

1. An animal trap comprising: a base, animal holding means mounted on the base, said animal holding means having a first rod secured to the base, first animal holding jaw means attached to the first rod, a second rod located adjacent the first rod and extended generally parallel thereto, second animal holding jaw means attached to the second rod and located in general transverse alignment with the first jaw means, means including at least one elongate tubular member secured to the first rod and pivotally mounted on the second rod whereby the second rod is movable relative to the first rod and the first and second jaw means are movable relative to each other between an open position and a closed position, coil spring means surrounding portions of the first rod, second rod and means including at least one elongate tubular member, said coil spring means cooperating with the base and second jaw means to bias the second jaw means to a closed position adjacent the first jaw means, and a trigger mechanism for holding the first and second jaw means in the open position against the force of the spring means, said trigger mechanism having a trip plate pivotally mounted with respect to the base, a movable arm pivotally mounted with respect to the base, said arm having means acting upon the trip plate to releasably hold the trip plate in a set position, and means having a member engageable with the arm to hold the first and second jaw means in the open position, said member being released when the trip plate is moved from the set position by an animal whereby the spring means moves the first and second jaw means to the closed position to trap the animal between said first and second jaw means.

2. The trap of claim 1 wherein: the base is a rod having a rectangular shaped outline.

3. The trap of claim 1 wherein: the base is a plate.

4. The trap of claim 1 wherein: the coil spring means includes a coil torsion spring positioned concentrically about the means including at least one tubular member and portions of the first and second rods.

5. The trap of claim 4 wherein: the coil torsion spring has one end in engagement with the second jaw means, and a portion of said end is engageable with the first jaw means when the first and second jaw means are in the closed position.

6. The trap of claim 5 wherein: the means having a member engageable with the arm include a finger attached to and extended from the second rod.

7. The trap of claim 1 including: third animal holding jaw means attached to the first rod in general longitudinal alignment with the first jaw means and spaced therefrom, and a fourth animal holding jaw means attached to the second rod in general longitudinal alignment with the second jaw means and selectively spaced therefrom whereby said third and fourth jaw means face one another, said third and fourth jaw means movable with the first and second jaw means between open and closed positions whereby the animal can be trapped between either the first and second jaw means or between the third and fourth jaw means.

8. The trap of claim 7 wherein: each jaw means is an arcuate rod.

9. The trap of claim 8 wherein: the coil spring means includes two coil torsion springs, a first torsion spring cooperating with the base and second jaw means to bias the second jaw means to the closed position, and a second torsion spring cooperating with the base and fourth jaw means to bias the fourth jaw means to a closed position adjacent the third jaw means.

10. The trap of claim 9 including: an end of the first torsion spring in an engagement with the second jaw means and engageable with the first jaw means when the first and second jaw means are in the closed position, and further including an end of the second torsion spring in engagement with the fourth jaw means and engageable with the third jaw means when the third and fourth jaw means are in the closed position.

11. The trap of claim 10 wherein: the means having a member engageable with the arm include a bar attached to the second jaw means and to the fourth jaw means.

12. The trap of claim 1 wherein: the means including at least one elongate tubular member comprise an elongate sleeve spanning substantially the length of the second rod.

13. The trap of claim 12 wherein: the sleeve is fixed to the first rod and mounted pivotally with respect to the second rod.

14. The trap of claim 1 wherein: the means including at least one elongate tubular member comprises two elongate sleeves which together span the majority of the length of the second rod.

15. The trap of claim 14 wherein: the elongate sleeves are secured to the second rod and pivotally mounted with respect to the first rod.

16. The trap of claim 1 wherein: the movable arm includes a finger attached to the trip plate, and a detent pivotally mounted with respect to the finger and pivotally mounted with respect to the base.

17. The trap of claim 16 wherein: the detent includes a hook portion and the finger includes an upstanding projection, first pivot means pivotally mounting the detent on the base and second pivot means connecting the detent to the finger, wherein said member engageable with the arm engages the hook portion and the projection when the trip plate is in the set position, and wherein rotation of the finger responsive to movement of the trip plate causes the projection to move said member with respect to the detent thereby disengaging said member from the hook portion and releasing said member.

18. The trap of claim 1 including: a back pivotally mounted to the base, said back attached to the trip plate and generally perpendicular thereto, means defining a slot adjacent an outside edge of the back, and an extension directed inwardly from said movable arm, said extension engageable with the means defining the slot to releasably hold the trip plate in the set position.

19. The trap of claim 1 including: a flexible wire band engageable with the trip plate to form a closed loop, movement of the loop causing movement in the trip plate from the set position.

20. An animal trap comprising: a base, animal holding means mounted on the base, said holding means having a first member attached to the base, first animal holding jaw means attached to the first member, a second member, second animal holding jaw means attached to the second member, means pivotally mounting the second member on the first member to locate the second jaw means adjacent the first jaw means whereby said jaw means are movable relative to each other between an open position and a closed position, said means pivotally mounting the second member on the first member including at least one tubular sleeve rotatably mounted on one of the members and secured to a portion of the other member, biasing means cooperating with the base and second jaw means to bias the jaw means to the closed position, said biasing means including a coil torsion spring positioned concentrically about the tubular sleeve and portions of the first and second members, and a trigger mechanism for holding the first and second jaw means in the open position against the force of the biasing means, said trigger mechanism including a trip plate pivotally mounted with respect to the base, a movable arm pivotally mounted with respect to the base and acting upon the trip plate to releasably hold the trip plate in set position, said movable arm including a finger attached to the trip plate, and a detent pivotally mounted with respect to the finger and with respect to the base, said detent including a hook portion and said finger including an upstanding projection, and means having a member engageable with the arm to hold the first and second jaw means in the open position, said member engaging the hooked portion and the projection when the trip plate is in set position, rotation of the finger responsive to movement of the trip plate by an animal causing the projection to move said member with respect to the detent thereby disengaging the member from the hook portion and releasing the member whereby the biasing means moves the first and second jaw means to the closed position to trap the animal between said jaw means.

21. The trap of claim 20 including: third animal holding jaw means attached to the first member in general longitudinal alignment with the first jaw means and spaced therefrom, and fourth animal holding jaw means attached to the second member in general longitudinal alignment with the second jaw means and selectively spaced therefrom whereby said third and fourth jaw means face one another, said third and fourth jaw means movable with the first and second jaw means between open and closed positions whereby the animal can be trapped between either the first and second jaw means or between the third and fourth jaw means.

22. The trap of claim 21 wherein: the biasing means includes a pair of coil torsion springs positioned about portions of the first and second members.

23. An animal trap comprising: a base, animal holding means mounted on the base, said holding means having a first member attached to the base, first animal holding jaw means attached to the first member, a second member, second animal holding jaw means attached to the second member, sleeve means secured to the second member and rotatably mounted on the first member to locate the second jaw means adjacent the first jaw means whereby said first and second jaw means are movable relative to each other between an open position and a closed position, said sleeve means including at least one tubular sleeve rotatably mounted on the first member and secured to a portion of the second member, biasing means comprising a coil torsion spring positioned concentrically about the sleeve means and portions of the first and second members cooperating with the base and second jaw means to bias the first and second jaw means to a closed position, and a trigger mechanism for holding the first and second jaw means against the force of the biasing means, said trigger mechanism having a trip plate pivotally mounted on the base, a movable arm pivotally mounted on the base engageable with the trip plate to releasably hold the trip plate in a set position, and means having a member engageable with the arm to hold the first and second jaw means in the open position, said member engageable with the arm being released when the trip plate is moved from a set position by the animal whereby the biasing means moves the first and second jaw means to the closed position to trap the animal between said first and second jaw means.

24. The trap of claim 23 wherein: the first member is a first rod and the second member is a second rod located adjacent the first rod, and said sleeve means comprise a pair of tubular members secured to the second rod and rotatably mounted on the first rod.

25. The trap of claim 23 including: third jaw means attached to the first member and fourth jaw means attached to the second member and located adjacent the third jaw means, said third and fourth jaw means being movable with the first and second jaw means between open and closed positions, whereby the animal can be trapped between either the first and second jaw means or the third and fourth jaw means.

26. The trap of claim 23 wherein: the biasing means includes a pair of coil torsion springs located about separate portions of the first and second members.

27. The trap of claim 23 wherein: the coil torsion spring has an end in engagement with the second jaw means, a portion of said end being engageable with the first jaw means when the first and second jaw means are in the closed position.

28. The trap of claim 23 wherein: the means having a member engageable with the arm includes a rod attached to the second jaw means.

29. The trap of claim 23 wherein: the means having a member engageable with the arm includes a finger attached to and extended from the second member.

30. The trap of claim 23 wherein: the movable arm includes a finger attached to the trip plate, and a detent pivotally mounted with respect to the finger and pivotally mounted with respect to the base, said detent having a hook portion cooperating with said member engageable with the arm when the trip plate is in the set position.

31. The trap of claim 30 including: first pivot means pivotally mounting the detent on the base and second pivot means pivotally connecting the detent to the finger.

* * * * *

UNITED STATES PATENT AND TRADEMARK OFFICE
CERTIFICATE OF CORRECTION

PATENT NO. : 4,109,407

DATED : August 29, 1978

INVENTOR(S) : Oscar F. Johnson

It is certified that error appears in the above–identified patent and that said Letters Patent are hereby corrected as shown below:

Column 1, line 17, "pair" should be -- pairs --.

Signed and Sealed this

Seventeenth Day of April 1979

[SEAL]

Attest:

RUTH C. MASON
Attesting Officer

DONALD W. BANNER
Commissioner of Patents and Trademarks